E. MURRAY.

SKATES.

No. 6,763.

Reissued Nov. 23, 1875.

Witnesses:
James A. Hunter
Arthur C. Dunlap

C W Dunlap
Assignee of Edgar Murray
Inventor.

N. PETERS, PHOTO-LITHOGRAPHER, WASHINGTON, D. C.

UNITED STATES PATENT OFFICE.

EDGAR MURRAY, OF NEW YORK, ASSIGNOR TO CHARLES W. DUNLAP, OF BROOKLYN, N. Y.

IMPROVEMENT IN SKATES.

Specification forming part of Letters Patent No. 45,674, dated December 27, 1864; reissue No. 6,763, dated November 23, 1875; application filed October 1, 1875.

*To all whom it may concern:*

Be it known that EDGAR MURRAY, of the city and State of New York, invented certain new and useful Improvements in Skates; and that the following is a full, clear, and exact description thereof, reference being had to the drawings annexed to and forming a part of this specification.

The invention consists, first, in the application of a hand-lever to a sole and heel clamping mechanism of a skate, so that by the movement of such hand-lever both the sole and heel clamps are simultaneously opened or closed in a convenient manner; second, in certain minor details of construction, hereinafter more fully described and referred to.

Figure 1:
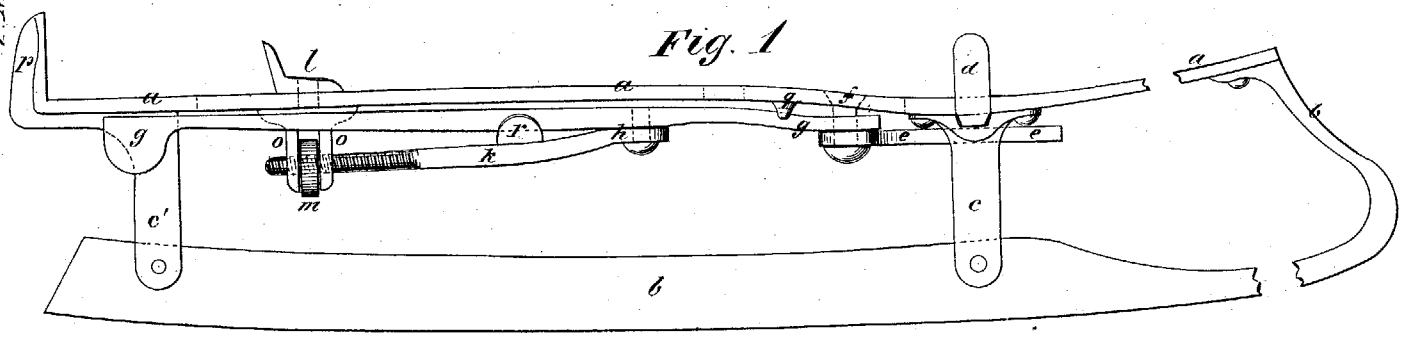
Figure 2:
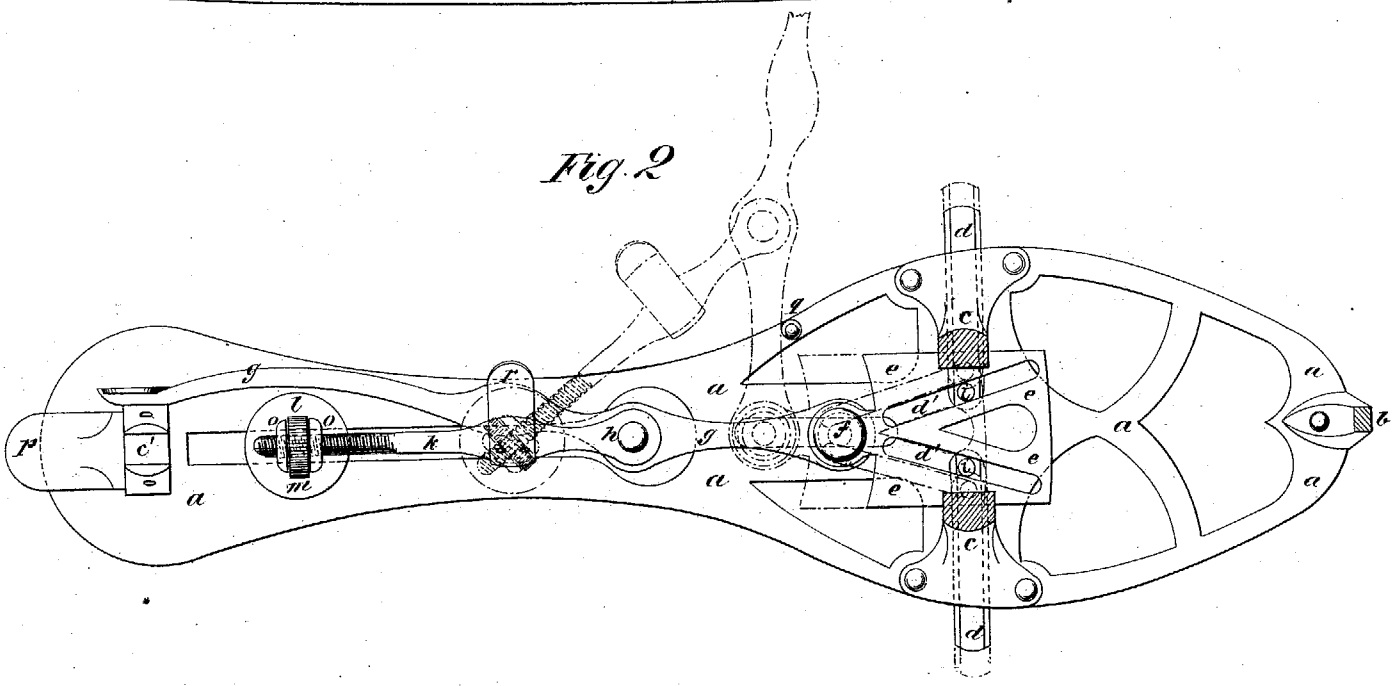

In the drawings, serving to illustrate one construction and arrangement of sole and heel clamping mechanism, with which I have combined a hand-lever, as well as certain details of construction which I claim specifically as improvements, Figure 1 is a side elevation of a skate embodying same, and Fig. 2 an inverted plan thereof with the runner removed.

*a* is a foot-plate. *b* is the runner, connected to the plate by the studs or supports *c c* and riser *b*. *d d* are clamps for the sides of the sole, set to slide in a groove provided for them in the support *c*, their ends being turned up and inclined slightly inward, to prevent their slipping off the sole. At the inner ends of these slide-clamps *d* are pins *i i*, entering grooves *d' d'* in the longitudinally-sliding plate *e*. These grooves diverge, so that the clamps are drawn together when the plate *e* is moved in one direction, and pressed apart when it is moved the other way. This plate *e* slides in a space provided for it in the support *c*, and is guided by a stud at *f*, entering a longitudinal slot in the foot-plate *a*. (See dotted lines in Fig. 2.) At the stud *f* a hand-lever, *g*, is connected, which lever extends toward the heel of the skate, and is jointed at *h* to a screw-link, *k*, that passes through flanges *o o* on the heel-clamp *l*. Between said flanges is the nut *m*, by means of which the distance between the clamp *l* and stud *f* can be adjusted. The object of this adjustment is to allow for different sizes of heels, because the stud *f*, when the clamps *d d* are closed firmly to the edges of the sole, becomes immovable, and the toggle-joint has to be straightened, in order that it may firmly press the clamp *l* upon the boot-heel, and so that the lever will not be liable to turn and disconnect the parts while in use. The fixed heel-clamp *p*, taking the back of the boot-heel, may be of any desired shape.

The operation is as follows: The skater applies the skate to his boot with the parts in the position shown by dotted lines in Fig. 2. He then turns the hand-lever *g* back toward its normal position, which causes the clamp *l* to press against the heel, and bind the same between itself and the heel-clamp *p*. At the same time the plate *e* is forced forward by the toggle-joint action between *o*, *h*, and *f*, and the clamps *d* are drawn tightly against the sides of the sole of the boot or shoe.

If the skate is not clamped tight enough when the hand-lever *g* is brought to the position shown by full lines in Fig. 2, the bar *k* is lengthened, which causes greater compression on the heel, and a corresponding increased clamping force by the clamps *d d*.

If the hand-lever *g* cannot be turned back to its place, the length of the bar *k* is to be shortened. The nut *m* allows for this adjustment.

A latch on the bar *k* at *r* receives the hand-lever *g* to hold the same in place; and, if desired, the parts may be so shaped that the center *h* of the toggle-joint *o h f* passes slightly beyond the straight line between *o* and *f*, so that the hand-lever *g* will be kept to its place while the skate is in use.

A stud is provided at *q*, that forms a fulcrum, against which the hand-lever *g* may conveniently act in drawing back the plate *e*, and releasing the clamps *d d*.

I claim as the invention of EDGAR MURRAY—

1. The combination of a hand-lever, *g*, with the sole and heel clamping mechanism, arranged to operate substantially as described.
2. The combination of the hand-lever *g* with the heel-clamp and the adjustable bar connecting said clamp and hand-lever, substantially as described.
3. The combination of the hand-lever *g* and plate *e* with the sole-clamps, substantially as described.
4. The combination of the hand-lever with the stud *q*, substantially as described.

Witnesses: C. W. DUNLAP.
JAMES H. HUNTER,
ARTHUR C. DUNLAP.